United States Patent [19]
Kipp

[11] 3,859,903
[45] Jan. 14, 1975

[54] ELECTRIC OVEN TOASTER TOAST SERVER MECHANISM

[75] Inventor: Frederick M. Kipp, Fairfield, Conn.

[73] Assignee: General Electric Company, Bridgeport, Conn.

[22] Filed: May 14, 1973

[21] Appl. No.: 359,910

[52] U.S. Cl. .................................. 99/391, 99/393
[51] Int. Cl. .......................................... A47j 37/08
[58] Field of Search...... 99/385, 329, 372, 376–377, 99/386, 389, 391–392, 393, 397, 399, 427, 450; 126/14, 41; 211/15, 49 D, 90, 96, 115–116, 131; 214/16.1 DA; 219/413; 222/166

[56] References Cited
UNITED STATES PATENTS

| | | | |
|---|---|---|---|
| 1,551,336 | 8/1925 | Shroyer | 99/391 |
| 1,769,893 | 7/1930 | Uhl | 99/329 RT X |
| 1,888,992 | 11/1932 | Lofgren et al. | 99/391 X |
| 2,387,817 | 10/1945 | Wales | 99/391 X |
| 2,414,081 | 1/1947 | Barclay | 99/391 X |
| 3,119,000 | 1/1964 | Loch et al. | 99/393 X |
| 3,193,663 | 7/1965 | Budzich et al. | 99/393 UX |
| 3,450,861 | 6/1969 | Hurko | 99/391 X |

FOREIGN PATENTS OR APPLICATIONS

| | | | |
|---|---|---|---|
| 1,280,779 | 11/1961 | France | 99/393 |

Primary Examiner—Edward L. Roberts
Assistant Examiner—Arthur O. Henderson
Attorney, Agent, or Firm—Leonard J. Platt; George R. Powers; John F. Cullen

[57] ABSTRACT

An electric oven toaster construction wherein a unique toast server mechanism is provided for lifting a bread supporting rack for sliding toast out of the front opening of the toaster. The bread supporting rack is mounted for pivotal movement within a toasting chamber, and a movable finger is provided for engagement with the bread and the supporting rack for sliding the toast forwardly and for lifting the rear portion of the rack to slide the toast out of the toaster.

12 Claims, 6 Drawing Figures

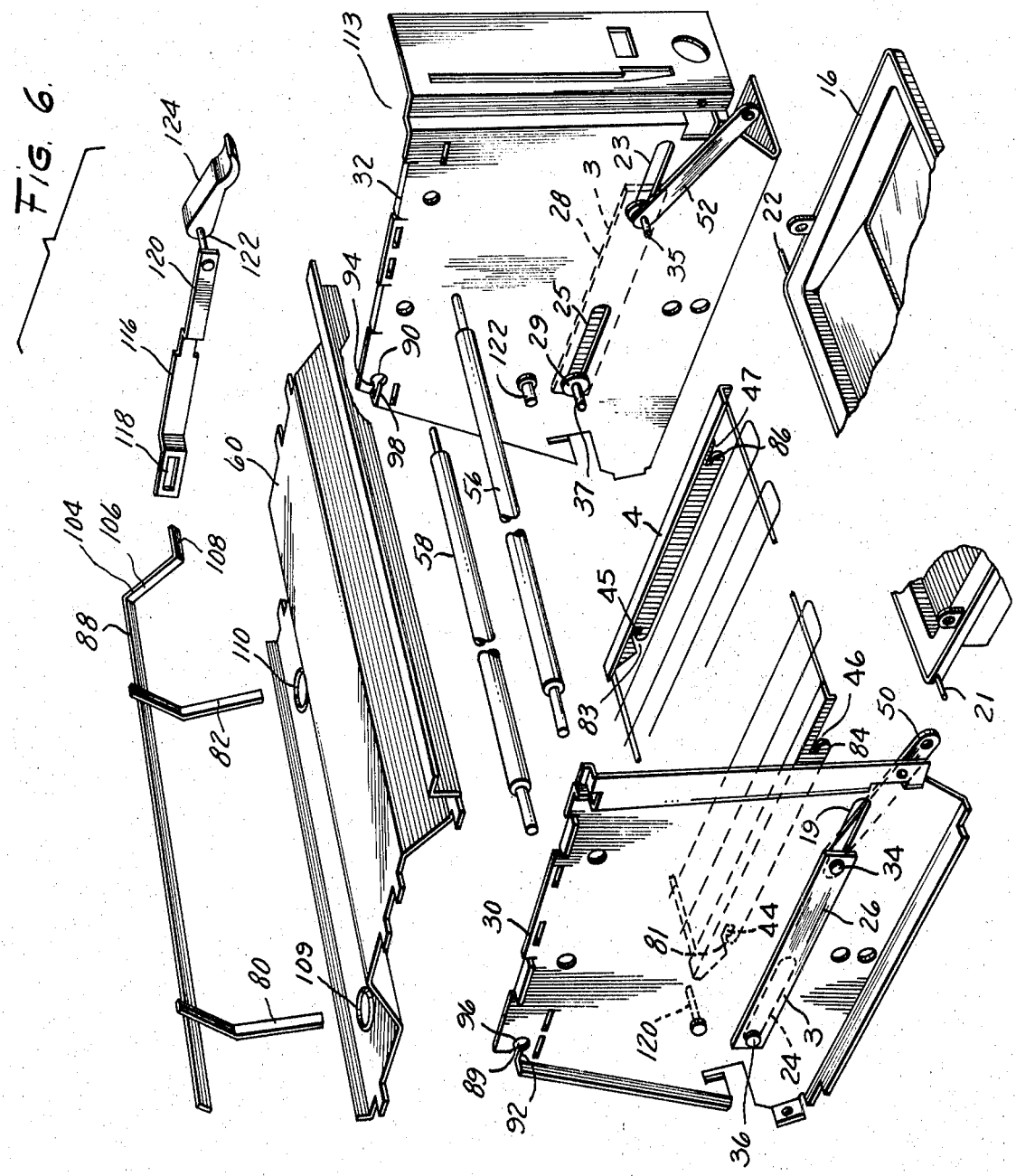

ELECTRIC OVEN TOASTER TOAST SERVER MECHANISM

BACKGROUND OF THE INVENTION

1. Field of the Invention:

This invention relates to an electric oven toaster of the type which may be used to toast bread or cook convenience foods such as frozen pizzas and TV dinners, and more particularly, to a toast server mechanism of such an oven toaster.

2. Description of the Prior Art:

In a prior U.S. Pat. No. 3,693,538 to Snyder dated Sept. 26, 1972, and assigned to the same assignee as the present invention, there is disclosed an oven toaster which may include my unique toast server mechanism. As shown in FIG. 1 of the patent, a cooking chamber for the oven toaster has a front opening and the door for the front opening is pivotally mounted at the lower portion of the oven toaster. Thus, the door may be opened by moving the top portion of the door away from the oven toaster to pivot the door about its lower portion until the door is moved to its full open horizontal position. A horizontal food supporting rack is mounted in the cooking chamber and levers are connected to a lower portion of the door for cooperating with the food supporting rack to move the rack partially out of the front opening when the door is opened. Although the forward pieces of toast are moved partially out of the front opening when the door is opened, the user must reach into the hot oven toaster for any slices of toast which may be located at the rear of the rack.

This invention is concerned with such an oven toaster, and more particularly, to a mechanism for lifting the rear portion of the rack so that the front and rear slices of toast may be slid off the rack and onto the open front door of the oven toaster.

Correspondingly, it is a primary object of this invention to provide a toast server mechanism for sliding toast out of the front opening of an oven toaster so that the user may grasp the toast without placing her hand into the hot oven toaster.

It is another object of my invention to provide a low cost toast server mechanism having relatively few parts which may be easily manufactured and readily added to an oven toaster of the type shown in the prior U.S. Pat. No. 3,693,538 to Paul V. Snyder.

SUMMARY OF THE INVENTION

In accordance with one of the aspects of this invention and electric oven toaster includes a cooking chamber having a front opening. Electric heating units are mounted at suitable locations in the cooking chamber and a generally horizontal rack for supporting bread or other food to be cooked is also positioned in the chamber and spaced from the heating units. The forward portion of the rack is pivotally mounted in the cooking and toasting chamber, and a lift finger is uniquely positioned within the cooking chamber behind the rack so that it may be moved into engagement with end portions of slices of toast and the rear portion of the rack to slide the toast forwardly and to lift the rear portion of the rack to thereby pivot the rack at its front portion to lift the rack and slide the toast out of the front opening. With this construction, the toast or other food which has been cooked may be readily served by simply moving a finger which is provided within the oven toaster to serve the food out of the front opening of the toaster. The user does not have to reach into a hot oven toaster in order to obtain the toast or other food which has been cooked.

In addition, with this mechanism, the food holding rack may be readily shaped and formed with respect to supporting pins which are located at the front of the oven toaster chamber so that the rack may be readily pivoted on the supporting pins which are normally required for supporting the rack without the use of additional hardware. Moreover, the finger for lifting the bread rack may be conveniently fixed to a rod which may be suitably rotatably mounted on the side plates of the oven toaster without requiring the use of separate bearing structure. Thus, an exceedingly simple and reliable toast server mechanism has been achieved.

BRIEF DESCRIPTION OF THE DRAWING

Other objects and attendant advantages of the invention will be apparent from the following description taken in connection with the accompanying drawing in which:

FIG. 6 is a fragmentary front exploded perspective view of the electric oven toaster shown in FIG. 1.

DESCRIPTION OF THE PREFERRED EMBODIMENT

Figure 1:
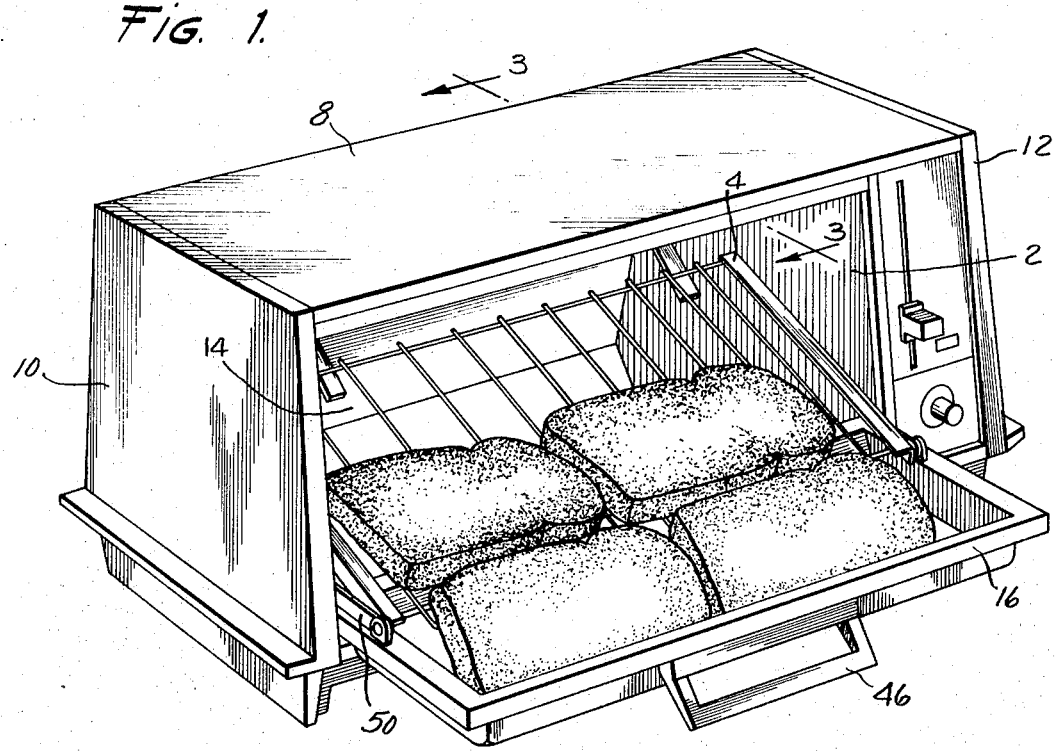
FIG. 1 is a front perspective view of an electric oven toaster embodying my toast server mechanism partially broken away to show details of construction.
Figure 2:
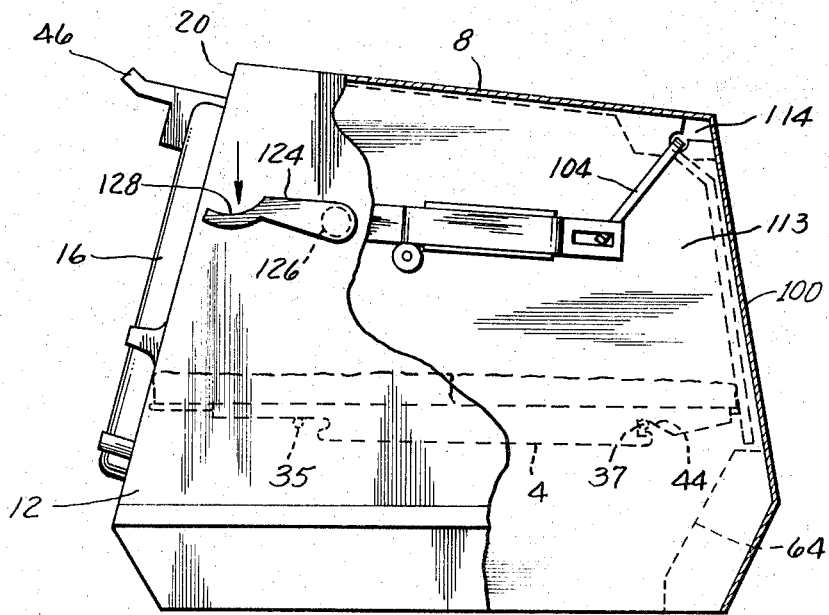
FIG. 2 is a right side elevational view thereof partially broken away to show details of construction.

Referring now to the drawing, and first particularly to FIGS. 1, 2 and 6, there is shown an electric oven toaster which includes a toasting and oven chamber 2 in which is mounted a generally horizontal carriage 3 for supporting a food rack 4 for holding food to be cooked or bread to be toasted. The oven toaster includes a generally horizontal top wall 8 generally parallel vertical side walls 10 and 12 and a front opening 14 to provide access to the inside of the oven toaster.

A front door 16 is provided for closing the front opening 14. The door 16 includes two outwardly projecting pivot pins 21 and 22 for pivoting the door to the lower portion of the oven toaster, and as shown in FIG. 1, the door 16 is in its generally horizontal full open position. As shown in FIG. 2, the front wall 20 of the of the toaster is slanted slightly to the rear so that the front door 16 is in a somewhat rearward vertical position when it is fully closed, the door being tilted slightly so that the top of the door is somewhat the rear of the lower portion of the door. Thus the force of gravity could hold the door in its closed position.

Figure 3:
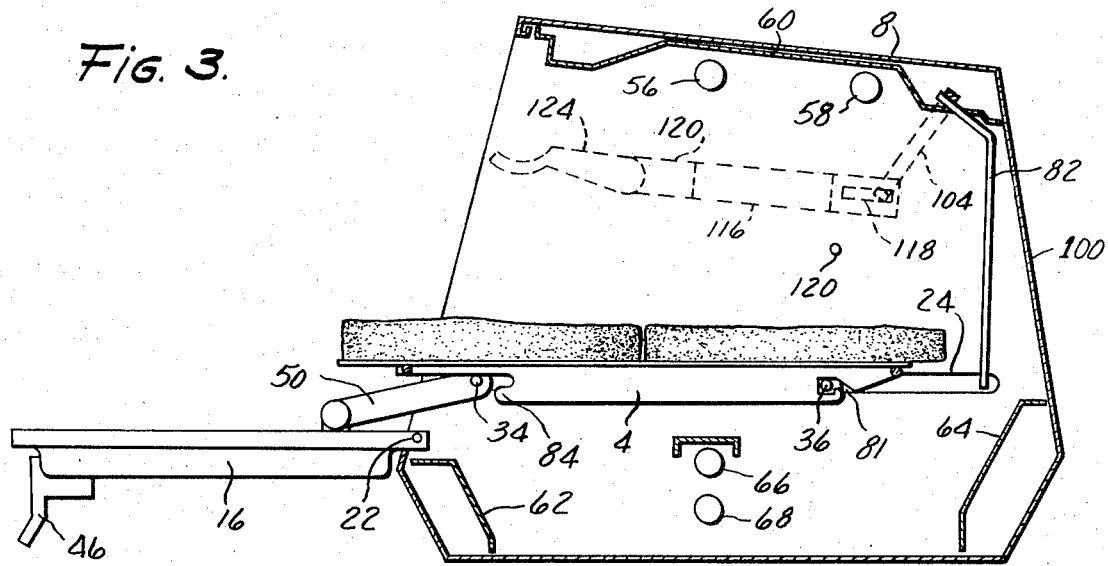
FIG. 3 is a cross-sectional view thereof taken substantially on the plane of 3—3 of FIG. 1 showing the oven toaster door in its open position with my unique toast server mechanism spaced from the rear of the toast.
Figure 4:
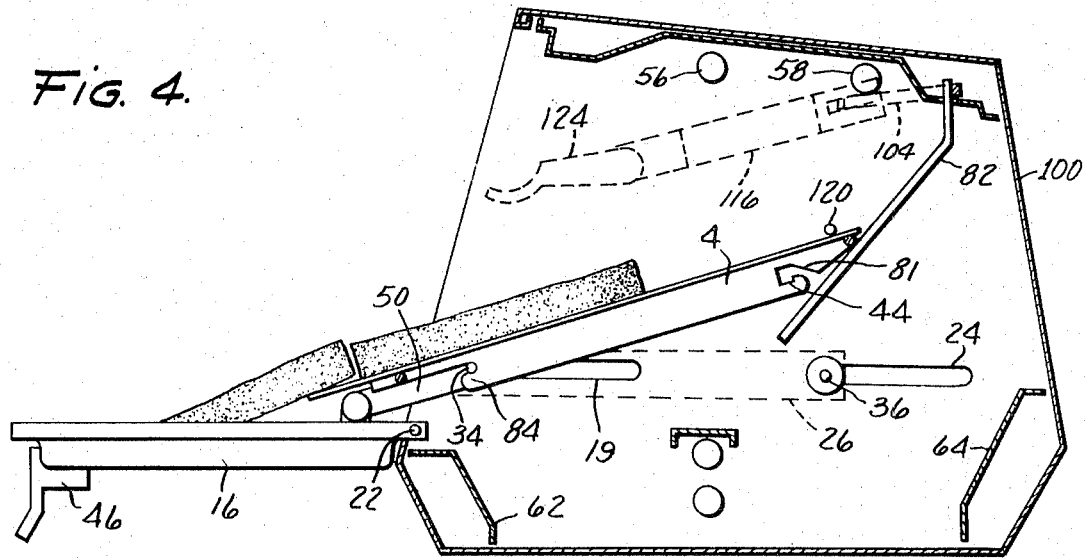
FIG. 4 is a view generally similar to FIG. 3 showing the door in its open position with my unique toast server mechanism in its fully actuated position after it has been moved into engagement with the rear slices of toast and has lifted the toast rack to slide the toast out of the front opening and onto the generally horizontal open door of the oven toaster.

As shown in FIGS. 3, 4 and 6 the food rack 4 is arranged to be moved partially through the front opening 14 of the oven toaster when the door is moved to its full open position. To achieve this, the carriage 3 for supporting its food rack 4 includes two carriage links 26 and 28 which are mounted for slidable movement in a forward or rearward direction in the oven toaster. Slots 19, 23, 24 and 25 are formed in two sheet metal side plates 30 and 32 of the oven toaster and outwardly projecting support pins 34, 35, 36 and 37 are riveted or otherwise secured to the carriage links 26 and 28 to slidably support the carriage 4 on the pins 34, 35, 36 and 37 within the slots 19, 23, 24 and 25. It can be seen that each of the pins includes a head portion 29 which has a diameter slightly larger than the width of the slots in which the pins are positioned, and thus after having been assembled to the carriage links 26 and 28, outward movement of the carriage links 26 and 28 is prevented by the engagement of the head portions of the pins with the inside walls of the side plates 30 and 32 in the vicinity of slots 19, 23, 24 and 25 in which the pins are mounted. With particular reference to FIG. 6 it can be readily seen that the carriage links 26 and 28 have a width which is larger than the width of slots 27, and thus, the carriage links 26 and 28 are prevented from moving through the slots and their inside surfaces are guided for slidable engagement on the outside surfaces of plates 30 and 32 in the vicinity of slots 19, 23, 24 and 25.

The food rack 4 is removably positioned on the forward carriage pins 34 and 35 and the rear carriage pins 36 and 37. As shown more particularly in FIG. 2, the left and right side portions of the food rack 4 include rear slots 44 and 45 and front slots 46 and 47 for connecting the sides of the food rack to the inwardly projecting pins 34, 35, 36 and 37. It can be appreciated that the food rack may be inserted within the oven toaster by positioning the rear slots 44 and 45 over the rear pins 36 and 37 and then pivoting the rear portion of the rack about the rear pins 35 and 36 while lowering the front portion of the rack until the forward left and right side pins 34 and 35 are moved into slots 46 and 47.

The front door 16 of the oven toaster is linked to the carriage 3 so that movement of the front door in a door opening direction will result in forward movement of the carriage 3 including the food rack 4 through the front opening 14 of the oven toaster. To achieve this, two door links 50 and 52 are conveniently pivoted to the front door and to the forward pins 34 and 35 on the carriage links 26 and 28, respectively. With this construction, it can be appreciated that when the door 16 is manually opened by pulling on its front handle 46, the door will swing downwardly about its pivots 21 and 22 and during this movement the door links 50 and 52 will pull outwardly on the forward pins 34 and 35 to slide the carriage 3 including links 26 and 28 and the food rack 4 out of the front opening 14 of the toaster.

With particular reference to FIG. 6, the basic components of the electric oven toaster may be readily observed. The toaster includes the two inner sheet metal side plates 30 and 32, upper sheathed electric heating elements 56 and 58, an upper reflector 60, lower reflectors 62 and 64, and lower heating elements 66 and 68. The two sheet metal side plates 30 and 32, the upper reflector 60, upper heating elements 56 and 58, lower reflectors 62 and 64, lower heating elements 66 and 68, and the front door 16 are all connected to each other without the use of separate fastening means. As shown more particularly in FIG. 6, the two sheet metal side plates are provided with a plurality of slots and apertures for receiving these structural components. With this arrangement, it can be appreciated that all of the aforementioned components are readily assembled to each other in one operation by simply holding the reflectors, the heating elements, and the door with its pivot pins adjacent to the slots and aperatures and then moving the side plates toward each other to thereby insert the tabs, pivot pins and other components into the appropriate slots and apertures in the side plates 30 and 32.

The structure so far described is illustrated and described in greater detail in the above mentioned prior U.S. Pat. No. 3,693,538 to Paul V. Snyder, assigned to the same assignee as the present invention.

TOAST SERVER MECHANISM

According to my invention, there is uniquely combined with the aforedescribed electric oven toaster door 16, carriage 3 and its supporting pins 34, 35, 36 and 37, and food rack 4, a mechanism for engaging end portions of slices of toast to slide the toast forwardly and for lifting the rear portion of the food rack 4 to slide toast or other food out of the front opening of the toaster after it has been cooked or toasted. This mechanism is uniquely constructed so that it may be economically positioned within the oven toaster with the use of relatively few parts. Moreover, the mechanism is constructed so that most of the parts may be located outside of the hot cooking chamber of the oven toaster, and with particular reference to FIGS. 4 and 6, it can be appreciated that two movable fingers 80 and 82 are the only components which are positioned within the cooking chamber for lifting the rear portion of the rack to slide the toast out of the front opening and onto the door 16.

In accordance with my invention, the forward and rear slots 46, 47, 44 and 45 of the rack 4 are uniquely shaped and located with respect to the supporting pins 34, 35, 36 and 37 so that the rack may be readily inserted within the oven toaster by simply grasping the forward portion of the rack, moving the rack rearwardly to insert the rear pins within the rear slots, and then dropping the forward portion of the rack to engage the forward portion of the rack in the vicinity of the forward slots 46 and 47 on the forward pins 34 and 35. As shown in FIG. 3, when this has been accomplished, the rear pins 36 and 37 will be in contact with a forward edge of the rear slots 44 and 45, and the forward pins 34 and 35 will be in front of lower lips 84 and 86 of the front slots 46 and 47 so that there is some lost motion between the rack supporting pins and the rack. With this arrangement, when the fingers 80 and 82 are moved forwardly to engage the rear portion of the rack, the rack is slid slightly forwardly to move the rear edge portions of the forward slots 46 and 47 into engagement with the forward pins 34 and 35. During this movement, it can be appreciated that the rear pins 36 and 37 are slid on the inclined surfaces 81 and 83 of the rear slots 44 and 45. Thus, the rack 4 is inclined slightly by the engagement of the rear pins 36 and 37 with the inclined surfaces of the rear slots, and further movement of the fingers 80 and 82 in a forward direction will slide the fingers on the rear portion of the rack 4 to lift the rear portion of the rack and pivot the front portion of the rack about the forward support pins 34 and 35. With this construction, the fingers 80 and 82 first push forwardly on end portions of slices of toast which may extend rearwardly beyond the rearward portion of the rack and then forwardly on the rack so that the rear portions of the forward slots are moved into engagement with the front pins 34 and 35, with lower forward lips 84 and 86 of the front slots 46 and 47 positioned below the support pins 34 and 35, so that the pin and slot connection at the forward portion of the rack will not become disengaged when the rear portion of the rack is lifted by the lift fingers 80 and 82.

With particular reference to FIG. 6, it can be appreciated that my unique finger arrangement may be manufactured so that all of the supporting components are located outside of the cooking chamber 4. As shown, the two fingers 80 and 82 may be welded or otherwise connected to a flat rod 88 which is generally rectangular in cross-section, and the rod 88 may be rotatably supported on the oven toaster within slots 89 and 90 which may be readily formed in the upper rear portions of side plates 30 and 32. As shown, the slots 89 and 90 have a relatively narrow throat portions 92 and 94, and generally circular inner portions 96 and 98, respectively, for rotatably supporting the rod 88 on the oven toaster. The throat portions 92 and 94 have a dimension which is greater than the minor cross-sectional dimension of the rod 88 but smaller than the major cross-sectional dimension of the rod 88. Thus, during assembly, the thin portion of the rod 88 may be slipped through the throat portions of the slots 90 and 92 and the rod may be released to allow the fingers 80 and 82 of the rod to pivot the rod by gravity. Thus, the wide portion of the rod 88 will face the throats of the slots to prevent the rod from being accidentally removed.

As shown in FIGS. 1 and 6, the right portion of the rod 88 is shaped as a crank 104 with a portion 106 generally perpendicular to the major portion of the rod and a short portion 108 generally parallel with the major portion of the rod. As shown, the crank 104 is positioned in a relatively cool control chamber 113 which is formed at the right side of the cooking chamber 4 between the side plate 32 and an outer side wall member 12 which may be formed of suitable plastic material.

As shown in FIGS. 2 and 6, the fingers 80 and 82 extend through suitable circular apertures 109 and 110 which are formed in the upper reflector 60 of the oven toaster so that the rod 88 and its pivot slots 89 and 90 are positioned outside of the cooking chamber 4 and within a small insulated chamber 114 which is formed at the upper rear portion of the oven toaster.

Figure 5:
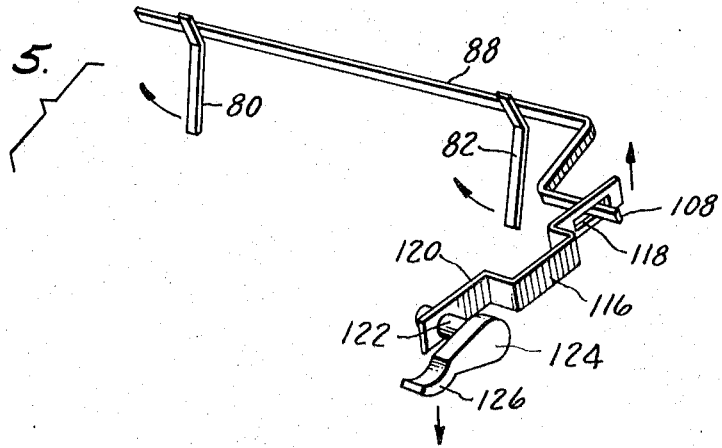
FIG. 5 is a fragmentary perspective view of my unique toast server mechanism.

A manually operable actuating mechanism is positioned at the right side of the oven toaster for rotating the crank 104 to move the fingers 80 and 82 and the food rack 4 to slide the food out of the oven toaster. As shown more particularly in FIG. 5, the mechanism includes an actuating lever 116 which has a slot 118 formed at one end thereof and receiving the crank end 108, and an opposite end 120 which is fixed to a shaft 122 that is integrally formed with or fixed to a manually operable lever 124. As shown more particularly in FIGS. 2 and 6, the shaft 122 is pivotally mounted in an aperture 126 which is formed in the outer wall 12 of the oven toaster.

TOAST SERVER OPERATION

When it is desired to use the toast server mechanism after bread has been toasted or other food has been cooked, it is merely necessary to open the front door of the oven toaster by pulling downwardly on the handle 46 to move the door 16 to its full open, generally horizontal position, as shown in FIG. 3. The outer manually operable lever 124 is suitably formed with a finger receiving portion 128, and thus, this portion may be moved downwardly by the user's finger to rotate the actuating lever mechanism in a generally counterclockwise direction to lift the slotted end 118, to thereby rotate the crank 104 in a clockwise direction, to move the fingers 80 and 82 forwardly to engage end portions of slices of toast to move them forwardly and then lift the rear portion of the rack, and slide the bread or other food which has been toasted or cooked out of the front of the oven toaster and onto the generally horizontal open front door 16.

With particular reference to FIGS. 4 and 6, it can be seen that suitable stop abutments 120 and 122 may be fixed to the side plates 30 and 32 of the oven toaster for preventing upward movement of the rear portion of the rack beyond the position shown in FIG. 4.

With particular reference to FIG. 3, it can be appreciated that the food rack may be completely removed from the oven toaster for cleaning or other purposes after the toaster has cooled by grasping the rack and lifting the front portion of the rack above the support pins 34 and 35. Then, the rack may be pulled forwardly to slide the rear pins 36 and 37 on the inclined surfaces 81 and 83 of the rear slots to completely remove the rack from the oven toaster. On complete removal of the rack, it can be appreciated that engagement of the fingers 80 and 82 with the rear wall 100 of the oven toaster stops rotation of the rod 88 in a counterclockwise direction, while engagement of the crank end 108 or the end 118 of the actuating lever with the top wall 8 of the oven toaster will limit rotation of the rod in a clockwise direction. Thus, the rod 88 cannot be rotated far enough to line up the narrow dimension of the rod with the throats 92 and 94 of the slots after it has been assembled in the oven toaster.

From the foregoing description, it will be appreciated that my invention may be operated to reliably slide toast or other food out of the front opening of an oven toaster so that a user of the appliance may grasp the cooked food without placing her hand into the hot oven toaster. The parts may be simply constructed and positioned so they can experience a long life. With this construction no supporting parts are positioned directly within the oven chamber 2 and the entire mechanism may be manufactured from two subassemblies. The actuating finger and rod subassembly 80, 82 and 88 may be readily formed and pivotally mounted on the oven toaster without the use of separate hardware. The pivots 89 and 90 for the rod 88 may be simply integrally formed with the side plates 30 and 32.

Accordingly, it will be appreciated that the parts of my unique toast server mechanism may be readily connected to each other and to the other parts of the oven toaster. Thus, an exceedingly simple yet reliable toast server mechanism has been achieved.

What I claim is:
1. An electric oven toaster comprising:

a. top, bottom, and side wall means forming a cooking and toasting chamber of substantial width, height and depth and said cooking chamber having an enlarged front opening;
b. a generally horizontal rack for supporting bread in a generally horizontal position in said cooking chamber or for supporting other food in a generally horizontal position in said cooking chamber, said rack having a forward portion and a rearward portion, the forward portion of said rack being pivotally mounted adjacent to the side walls of said cooking and toasting chamber in said toasting and cooking chamber, and said rearward portion being supported against downward movement when in said horizontal position but being free to be lifted upwardly;
c. first electric heating means mounted in said cooking and toasting chamber closely adjacent to the top wall means and spaced a substantial distance above said rack;
d. second electric heating means mounted in said cooking and toasting chamber closely adjacent to the bottom wall means and spaced a relatively short distance below said rack; and
e. a lift finger positioned within said cooking and toasting chamber closely adjacent to the rear wall of said chamber between the rear wall of the chamber and the rearward portion of said rack for lifting the rearward portion of said rack to thereby pivot the rack and slide the toast or other food out of the front opening.

2. An electric oven toaster as defined in claim 1 wherein a door is pivoted to said wall means at a lower portion of said front opening below said generally horizontal rack so that when the door is moved to its lower open generally horizontal position the lift finger may lift the rack and slide the toast out of the front opening and onto the generally horizontal surface of the open door.

3. An electric oven toaster as defined in claim 1 wherein a generally horizontal rod is pivotally mounted at an upper rear portion of the oven toaster, said lift finger is attached to said rod and a manuallly operable lever is positioned outside of the cooking chamber of said oven toaster for rotating said rod to move said finger to lift the rear portion of the rack and slide the toast out of the front opening.

4. An electric cooking appliance as defined in claim 3 wherein said lift finger extends downwardly from said rod at one side of the cooking chamber of said oven toaster and another finger is attached to said rod and extends downwardly therefrom at the other side of said cooking chamber so that both of said fingers may contact the rear portion of said food rack for lifting the rack to slide the toast or other food out of the front opening of the oven toaster.

5. An electric cooking appliance as defined in claim 1 wherein a stop pin is fixed to the wall means of said cooking chamber for limiting upward movement of said food rack.

6. An electric cooking appliance as defined in claim 1 wherein stop means is located on said oven toaster for preventing movement of said actuating finger into engagement with the electric heating means of said cooking appliance.

7. An electric cooking appliance as defined in claim 1 wherein an actuating linkage is provided for lifting said finger by moving a lever which is located on the outside of the oven toaster and the mechanical advantage of said actuating linkage is very poor so that while the lever may be readily actuated to lift the horizontal rack and relatively light slices of toast, it would be difficult to lift a relatively heavy piece of food in a cooking pan.

8. An electric oven toaster comprising:
a. top, bottom and side wall means forming a cooking and toasting chamber of substantial width, height and depth, and said cooking chamber having an enlarged front opening, said side wall means including a rear wall and two side walls;
b. a generally horizontal rack for supporting bread in a generally horizontal position in said cooking chamber or for supporting other food in a generally horizontal position in said cooking chamber, said rack having a forward portion and a rearward portion, the forward portion of said rack being pivotally mounted adjacent to the side walls of said cooking and toasting chamber in said toasting and cooking chamber, the rearward portion of said rack being spaced from said rear wall and said rearward portion being supported against downward movement when in said horizontal position but being free to be lifted upwardly;
c. first electric heating means mounted in said cooking and toasting chamber closely adjacent to the top wall means and spaced a substantial distance above said rack;
d. second electric heating means mounted in said cooking and toasting chamber closely adjacent to the bottom wall means and spaced a relatively short distance below said rack; and
e. a lift finger positioned within said cooking and toasting chamber closely adjacent to the rear wall of said chamber between the rear wall of the chamber and the rearward portion of the rack for moving into engagement with end portions of slices of toast which may extend rearwardly beyond the rearward portion of the rack and for pushing forwardly on such slices of toast and for lifting the rearward portion of said rack to thereby pivot the rack and slide the toast or other food out of the front opening.

9. An electric oven toaster as defined in claim 8 wherein a door is pivoted to said wall means at a lower portion of said front opening below said generally horizontal rack so that when the door is moved to its lower open generally horizontal position the finger may slide the toast out of the front opening and onto the generally horizontal surface of the open door.

10. An electric oven toaster as defined in claim 8 wherein a generally horizontal rod is pivotally mounted at an upper rear portion of the oven toaster, said finger is attached to said rod and extends downwardly therefrom and a manually operable lever is positioned outside of the cooking chamber of said oven toaster for rotating said rod to move said finger to slide the toast out of the front opening.

11. An electric oven toaster construction having two generally vertical side walls, a top wall and a front opening comprising:
a. a cooking and toasting chamber;
b. electric heating means positioned in said oven toaster for supplying heat to said chamber for cooking and toasting purposes;

c. a pair of forward toast rack supporting pins extending inwardly from the forward portion of said vertical side walls;
d. a pair of rearward toast rack supporting pins extending inwardly from the rearward portion of said vertical side walls;
e. a toast rack having a forward portion and a rearward portion, said toast rack being positioned within said oven toaster and connected to said forward pins and said rearward pins so that said rack may be pivoted about said forward pins and lifted at its rearward portion above said rearward pins; and
f. a lift finger mounted within said toasting chamber behind said toast rack movable into engagement with the toast rack for pushing forward on the rack and lifting the rearward portion of said rack to pivot the rack and slide the toast out of the front opening.

12. An electric oven toaster as defined in claim 11 wherein a pair of slots are formed in a forward portion of said toast rack for receiving said pair of toast rack supporting pins, each of said slots having wall means which may be located above, below and at the rear of said supporting pins for suitably holding the rack while it is being pushed forward and pivoted about said forward supporting pins.

* * * * *